US012411983B2

United States Patent
Ikonomov

(10) Patent No.: US 12,411,983 B2
(45) Date of Patent: Sep. 9, 2025

(54) METHOD FOR ACQUIRING PERSONALIZED INFORMATION ABOUT A USER

(71) Applicant: Artashes Valeryevich Ikonomov, Moscow (RU)

(72) Inventor: Artashes Valeryevich Ikonomov, Moscow (RU)

( * ) Notice: Subject to any disclaimer, the term of this patent is extended or adjusted under 35 U.S.C. 154(b) by 153 days.

(21) Appl. No.: 18/555,962

(22) PCT Filed: Apr. 12, 2022

(86) PCT No.: PCT/RU2022/050127
§ 371 (c)(1),
(2) Date: Oct. 18, 2023

(87) PCT Pub. No.: WO2022/225425
PCT Pub. Date: Oct. 27, 2022

(65) Prior Publication Data
US 2024/0211629 A1 Jun. 27, 2024

(30) Foreign Application Priority Data
Apr. 18, 2021 (RU) .......................... RU2021110836

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
CPC .................. G06F 21/6245; G06F 21/604
See application file for complete search history.

(56) References Cited

U.S. PATENT DOCUMENTS

| 9,495,550 | B2 * | 11/2016 | Anderson | ............... G06Q 20/29 |
| 9,971,526 | B1 | 5/2018 | Wei et al. | |
| 2007/0006322 | A1 * | 1/2007 | Karimzadeh | ....... G06F 21/6227 726/28 |
| 2013/0117526 | A1 | 5/2013 | Florendo | |
| 2014/0095544 | A1 | 4/2014 | Eshel et al. | |
| 2014/0359054 | A1 | 12/2014 | Kuznetsov et al. | |
| 2016/0371438 | A1 * | 12/2016 | Annulis | .................. G06F 21/32 |
| 2018/0197143 | A1 * | 7/2018 | Daub | ..................... G16H 10/60 |

(Continued)

FOREIGN PATENT DOCUMENTS

RU          2709288 C1    12/2019

OTHER PUBLICATIONS

International Search Report and Written Opinion dated Aug. 1, 2022 in corresponding application No. PCT/RU2022/050127; w/English translation and partial translation (total 8 pages).

(Continued)

*Primary Examiner* — Chau Le
(74) *Attorney, Agent, or Firm* — Seckel IP, PLLC

(57) ABSTRACT

The methods for acquiring personalized information about a user entail forming a database of personalized information about the user. The database of personalized information about the user is divided into separate areas, each of which corresponds to a specific group of user data, and has its access code stored in the database of personalized information about the user. The user's actions are automatically tracked.

7 Claims, 1 Drawing Sheet

(56) References Cited

U.S. PATENT DOCUMENTS

2021/0326474 A1* 10/2021 Sparks ................... G06Q 10/10
2022/0011999 A1* 1/2022 Lovelock ................ G06F 3/147
2024/0338702 A1* 10/2024 Jih ................... G06Q 20/40145

OTHER PUBLICATIONS

"QR code instead of a passport. When will a smartphone replace documents", May 29, 2020, https://4pda.ru/2020/05/29/371858/ (last visited Oct. 18, 2023); w/English machine translation (total 7 pages).

* cited by examiner

METHOD FOR ACQUIRING PERSONALIZED INFORMATION ABOUT A USER

FIELD OF THE INVENTION

The present invention relates to methods for acquiring personalized information about a user which comprise forming a database of personalized information about the user.

Following terms are used in the disclosure:

A server is any electronic device that performs service functions at the request of a client and provides access to specified resources. For this disclosure, a server is defined to have a permanent connection to an interconnected network that can transfer data from client devices to the server. The server can process this data and send a processing result back to the client device.

An interconnected network and all connections between all modules and units includes different topologies, configurations, and layouts of interconnected components designed to link enterprise, global, and local area networks, and include traditional wired, wireless, satellite, optical, and equivalent networking technologies. Generally, an Internet is used as the interconnected network.

A personal device of a user is any form of computing platform that connects to a network, such as an interconnected network, and enables interaction with application programs. Typical examples of personal devices include, but are not limited to, stationary and portable personal computing machines, smart mobile phones, portable computers including tablets, lightweight clients, workstations, dumb terminals coupled to an application server, and various arrangements and configurations thereof, i.e., both physical devices for interaction in communication interaction systems and virtual devices implemented on programmable computer devices and having a program interface for implementing communication functions. This is usually a smartphone (i.e., a mobile phone that includes functions of a computer device) with a touch-screen display, or a tablet computer, or similar devices such as smart watches, glasses, etc. Such devices are often portable.

A blockchain, i.e. a block transaction chain, is a chain of formed transaction blocks stored in a distributed database built according to certain rules.

BACKGROUND

The process of digitizing all data is currently gaining more importance and speed. The aim is to replace all non-electronic data carriers with electronic ones and store the data in a cloud. There are plans to replace paper identity documents with smartphone applications. In particular, on May 25, 2020, the Russian Ministry of Communications proposed launching a "Mobile ID" application, which will serve as an alternative to the identity document. It would work like this. A user registers on the Gosuslugi website and in the "System for Managing Access to the Information Resources of Moscow". Then the user downloads the application and contacts a Multifunctional Public Services Center, where the application is activated and a QR code for access to the "Mobile ID" is issued.

See, for example, https://4pda.ru/2020/05/29/371858/.

This approach was chosen as a prototype for the proposed invention since it is the closest in technical essence and achieves the desired technical outcome.

A disadvantage of this prototype is that the said data has a limited range of practical applications, in particular it does not allow for automatic updates, which is important given that health status, financial data, and other personal information are not static and subject to change over time.

Additionally, when accessing this data, it is necessary to differentiate user groups and their corresponding access rights.

In fact, a "customs officer" or a "border guard officer" requires access to specific data regarding visas and border crossing history rather than irrelevant information such as health status. But if a person is crossing the border during a pandemic, the customs officer needs access to immunization records and pandemic disease tests.

Contrary, a doctor requesting access to a database of personalized information about the user does not require information about border crossings. However, in situations where the risk of infection from disease hotspots exists, access to border crossing data can be granted.

But these user groups do not require, for example, personal information from the data area of all the user's purchases, including expiration dates for those items that have one.

DISCLOSURE OF THE INVENTION

Thus, the present invention mainly aims to propose a method for acquiring personalized information about a user which comprises forming a database of personalized information about a user to at least mitigate at least one of the mentioned disadvantages, namely to provide access to different areas of the database of updated personalized information about the user to interested parties with different access rights, which is the technical problem of the present invention.

To achieve the goal, the method further comprises the following stages:

dividing the database of personalized information about the user into separate areas, each of which corresponds to a specific group of user data and has its access code stored in the database of personalized information about the user;

automatically tracking user actions that change the personalized user information, wherein if such changes are recorded, they are automatically introduced into the database of personalized information about the user;

to obtain personalized user information, generating a graphic code on a user's personal device to be used to receive access to the database of personalized information about the user;

when the graphic code is activated on the user's personal device by the interested party, sending, from the interested party's personal device, a request to the database of personalized information about a user, the request comprising a request for the interested party's access to a specific area of the database of personalized information about the user, for which the access code is automatically requested from the personal device of the interested party;

if the access code sent from the personal device of the interested party matches the access code stored in the database of personalized information about the user, granting access, otherwise not granting; and when authorizing access to the specific area of the database of personalized information about the user, transmitting the relevant personalized user information from this database area to the interested party.

These useful features allow to update the database of personalized information about the user automatically, to organize it into areas, and to grant access to the interested parties to one or probably more specific areas of the database of personalized information about the user using a corresponding access code.

In yet another embodiment of the invention, the database of personalized information about the user is divided into separate sections that correspond to the user's biometric, passport, financial, medical, and geolocation data.

These useful features make it possible to populate the database with information that needs to be segmentized into distinct areas.

Another embodiment of the invention comprises automatically supplementing the database of personalized information about the user with a data area of all the user's purchases, including expiration dates for those items that have one.

These useful features make it possible to update a special area in the database of personalized information about a user, i.e., a data area of all goods purchased by the user, including expiration dates for those items that have one, which is very convenient for the user, as it allows to access such information from anywhere.

This can be accomplished by automatically scanning each check paid by the user and adding expiration date for items that have one.

In addition, the use of products can be monitored through various methods, for example by monitoring contents of a refrigerator with content monitoring devices, such as a smart refrigerator.

Another embodiment of the invention comprises forming a database of personalized information about the user in such a way that one part of the database is located on a remote server and another part is located on the user's personal device.

These useful features make it possible to accelerate the user's access to the part that is on the user's personal device, especially in the absence of the Internet or a similar network.

In one embodiment of the invention, a database of personalized information about a user is formed using a Blockchain technology.

These useful features make it possible to prevent data changes in the database of personalized information about the user.

In yet another embodiment of the invention, signals providing reminders of critical deadlines corresponding to the stored data are automatically sent to the user's personal device.

These useful features make it possible to provide reminders of critical deadlines corresponding to the stored data. Reminders can be provided of deadlines, for example, renewing a passport, visiting the doctor, periodic health checks, payment deadlines, etc.

Finally, in one embodiment of the invention, signals that provide a reminder of the expiration date of the purchased goods are automatically sent to the user's personal device.

These useful features make it possible to provide reminders about the expiration date of the purchased goods.

An aggregate of essential features of the proposed invention is unknown from the prior art for methods of similar purpose, which allows us to conclude that it meets a novelty criterion for the invention with respect to the method. A non-obviousness of the solution and the global nature of the problem to be solved, which so far has remained unsolved, indicates that the solution is not obvious to a person skilled in the art and, thus, the invention meets an inventive step criterion.

BRIEF DESCRIPTION OF THE DRAWINGS

Other features and advantages of the present invention are apparent from the description given below by way of illustration and without limitation, with reference to the accompanying figures, wherein.

Figure 1:
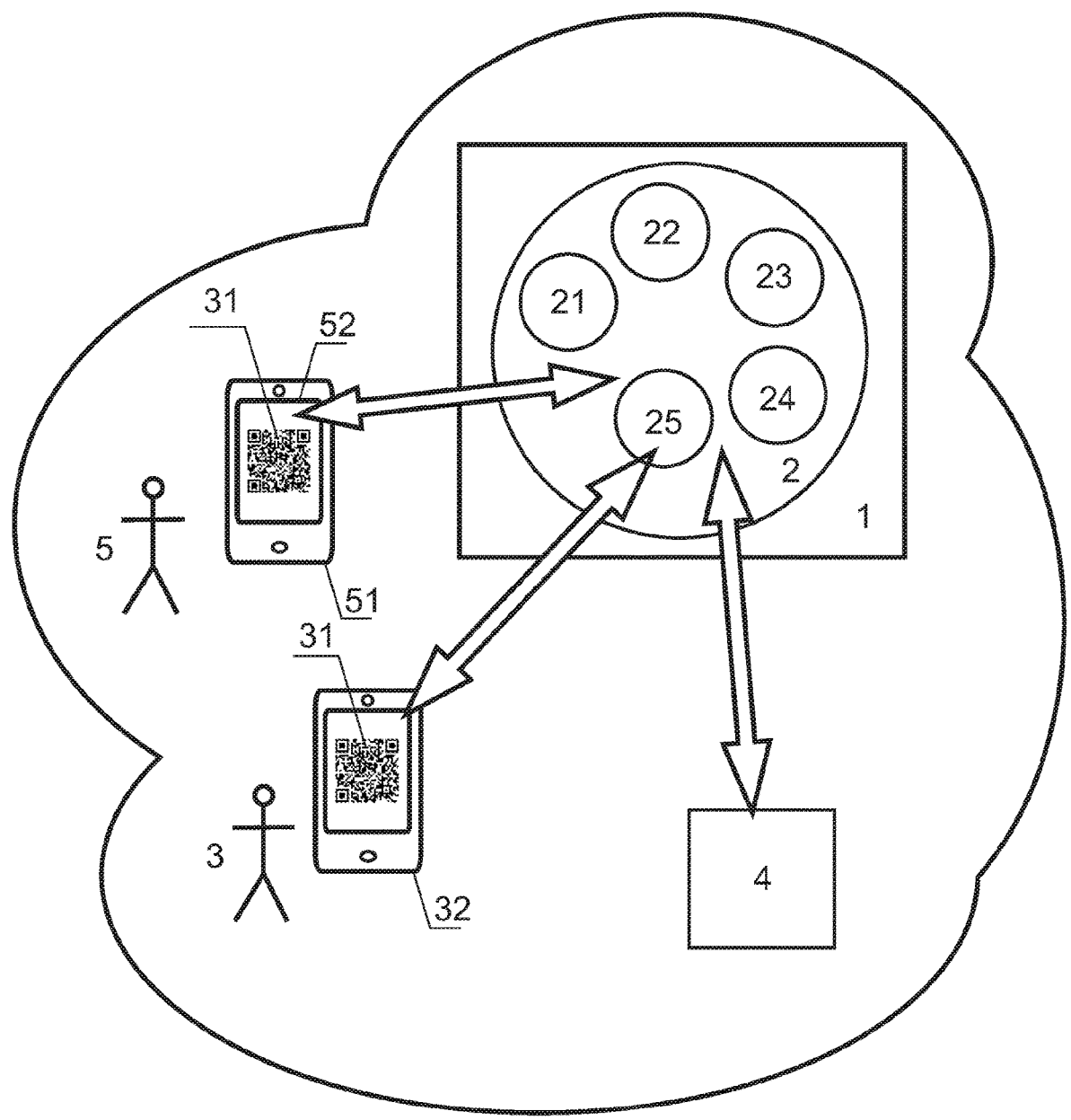
FIG. 1 depicts a functional scheme for acquiring personalized information about a user based on the proposed method according to the invention.

According to FIG. 1, a database 2 of personalized information about a user 3 is formed on a remote server 1. The database of personalized information about the user is divided into separate areas 21, 22, 23, 24, each corresponding to a specific group of user data and having its access code stored in the database 2 of personalized information about the user 3.

The database of personalized information about the user is divided into the separate areas corresponding, for example, to biometric 21, passport 22, financial 23, medical 24, and geolocation 25 data of the user.

The database 2 of personalized information about the user is generally formed in such a way that one part of the database 2 is located on a remote server and another part is located on the user's personal device. The database of personalized information about the user is primarily formed using a Blockchain technology. For simplicity, FIG. 1 shows that the entire database is located on the remote server 1.

Each area of the database 2 of personalized information about the user is connected to various sensors and servers, shown as 4, for a data exchange, which allow for automatic tracking of user actions 3 that change the personalized information about the user. When such changes are recorded, the database of personalized information about the user is updated automatically.

For example, laboratories that perform medical tests have servers that automatically update information in multiple databases of personalized information about the user. Customs services have servers that automatically update information in multiple databases of personalized information about the user, etc.

Optionally, the database of personalized information about the user is automatically supplemented with a data area of all user's purchases, including expiration dates for those items that have one. This is not shown in FIG. 1.

If an interested party 5 (it could be the user 3 himself, but for the sake of clarity the interested party is shown in FIG. 1 as another person) wishes to obtain personalized information about the user 3, then a graphic code 31 is generated on the personal device 32 of the user 3 for this purpose to get access to the database 2 of personalized information about the user 3.

The interested party 5 scans the graphic code 31 with their personal device 51. It appears on a display 52 of the device 51.

When the graphic code 31 is activated on the user's personal device, i.e. after it has been scanned, by the interested party 5, a request is sent from their personal device 51 of the interested party to the database 2 of personalized information about the user 3 to provide access for the interested party 5 to a specific area of the database 2 of personalized information about the user 3, for which access code is automatically requested from the personal device 51 of the interested party.

If the access code sent from the personal device 51 of the interested party 5 matches the access code stored in the database 2 of personalized information about the user 3, the access is granted, otherwise not granted.

When the access to the specific area of the database of personalized information about the user is authorized, a relevant personalized information about the user 3 is transmitted from this database area, for example from area 24, to the interested party.

EMBODIMENTS OF THE INVENTION

The method for acquiring personalized information about a user works in a following manner. Even the most complete example of an embodiment of the invention does not limit its application.

Figure 2:
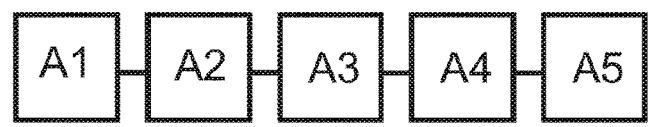
FIG. 2 schematically depicts stages of the method for acquiring personalized information about the user according to the invention.

According to FIG. 2:

Stage A1. A database 2 of personalized information about a user 3 is formed, wherein the database 2 of personalized information about the user is divided into separate areas 21, 22, . . . , each corresponding to a specific group of user data and having its access code stored in the database of personalized information about the user.

For example, the database of personalized user information is divided into separate areas corresponding to biometric, passport, financial, medical, and geolocation data of the user.

The database of personalized information about the user is generally formed in such a way that one part of the database is located on a remote server and another part is located on the user's personal device. The database of personalized information about the user is primarily formed using a Blockchain technology.

Stage A2. Actions of the user 3 that change the personalized information about the user are automatically tracked, and if such changes are recorded, they are automatically introduced into the database 2 of the personalized information about the user.

Optionally, the database 2 of personalized information about the user is automatically supplemented with a data area of all the user's purchases, including expiration dates for those items that have one.

Stage A3. To obtain personalized user information, a graphic code is generated on the user's personal device to be used to receive access to the database of personalized information about the user.

Stage A4. When the graphic code is activated on the user's personal device by an interested party, a request is sent from the personal device of the interested party to the database of personalized information about the user, the request comprising a request for the interested party's access to a specific area of the database of personalized information about the user, for which the access code is automatically requested from the personal device of the interested party.

If the access code sent from the personal device of the interested party matches the access code stored in the database of personalized information about the user, access is granted, otherwise not granted.

When authorizing access to the specific area of the database of personalized information about the user, the relevant personalized user information is transmitted from this database area to the interested party.

Stage A5. Signals providing reminders of critical deadlines corresponding to the stored data are then automatically sent to the user's personal device. Optionally, signals providing the reminders of the expiration date of the purchased goods are automatically sent to the user's personal device.

Example 1

While driving on a road, a driver is pulled over by a traffic officer. The driver presents a QR code displayed on their smartphone screen to the officer for scanning. This action generates an automated request to the database of personalized information about the driver along with an access code for the traffic officer to check the relevant area of the database, which comprises information on the vehicle, technical inspection results, fines, violations, accidents, driver's rights to use the vehicle, and a driver's license.

Example 2

An employee is stopped at a checkpoint at its workplace. The employee displays a QR code on their smartphone, which the security guard scans with their own smartphone. This generates an automated request to the database of personalized information about the employee and the access code for the security guard. The employee can then gain entry to the workplace using the generated access code.

Example 3

A patient visits a doctor and displays a QR code on their smartphone. The doctor uses their smartphone to scan the code, which automatically generates a request to the database of personalized information about the patient and the doctor's access code. This information is then used to review the patient's health status, tests, and hospital records. When medication is prescribed, the time it should be taken is recorded in the database 2. The patient is then sent a reminder signal on their personal device from the database 2, which also includes a possible date of their next doctor's appointment.

Example 4

A buyer enters a store, makes a purchase, and all his purchase and expiration date information is automatically duplicated in its personalized database. When unused goods are nearing their expiration date, the buyer receives a reminder on their personal device from the database 2.

In all cases, the QR code remains the same and leads to the same personalized user database. Depending on the access codes used, different areas of data are accessed.

INDUSTRIAL APPLICABILITY

The proposed method for acquiring personalized information about a user can be implemented by a qualified specialist in practice and, when implemented, achieves the claimed purpose, which leads to the conclusion that it meets the industrial applicability criterion of the invention.

In accordance with the proposed invention, a pilot system for acquiring personalized information about a user has been manufactured, i.e. servers have been specially configured to process all data and then tested.

Tests of the pilot system have shown that it provides the ability to:

automatically differentiate user rights by the level of access to the database of personalized information about the user;

automatically verify user access parameters by their user identification codes;

automatically update data in the database of personalized information about the user;

automatically provide a reminder of deadlines, for example, renewing a passport, visiting a doctor, periodic health checks, payment deadlines, etc.

Thus, the present invention achieves the stated objective of providing access to different areas of the database of updated personalized information about the user to interested parties with different access rights.

An additional useful technical result of the claimed invention is that:

this method makes it possible to issue passports to citizens in a uniform manner;

this method makes it possible to obtain statistics about all citizens;

this method enables state regulatory bodies to detect law and order violations.

The invention claimed is:

1. A method for acquiring personalized information about a user, the method comprising:

forming a database of personalized information about the user, dividing the database of personalized information about the user into separate areas, wherein each of the separate areas corresponds to a specific group of user data and has a respective access code stored in the database of personalized information about the user;

automatically tracking user actions that change the personalized information about the user, wherein if changes are recorded, the changes are automatically introduced into the database of personalized information about the user;

to obtain personalized user information about the user, generating a graphic code on a personal device of the user, wherein the personal device is adapted to be used to receive access to the database of personalized information about the user;

when the graphic code is activated on the personal device of the user by an interested party, sending, from a personal device of the interested party, a request to the database of personalized information about the user, the request comprising a request for access by the interested party to a specific area of the database of personalized information about the user, wherein the access code of the specific area is automatically requested from the personal device of the interested party;

if the access code sent from the personal device of the interested party matches the access code stored in the database of personalized information about the user, granting access, otherwise not granting; and when authorizing access to the specific area of the database of personalized information about the user, transmitting a relevant personalized user information from the specific area to the interested party.

2. The method according to claim 1, wherein the database of personalized information about the user is divided into a plurality of separate areas corresponding to biometric, passport, financial, medical, and geolocation data of the user.

3. The method according to claim 1, wherein the database of personalized information about the user is automatically supplemented with a data area of all goods purchased by the user, including expiration dates for at least one item among the goods.

4. The method according to claim 3, wherein signals providing reminders of the expiration date of purchased goods are automatically sent to the personal device of the user.

5. The method according to claim 1, wherein the database of personalized information about the user is formed so that one part of the database is located on a remote server and another part is located on the personal device of the user.

6. The method according to claim 1, wherein the database of personalized information about the user is formed using a Blockchain technology.

7. The method according to claim 1, wherein signals providing reminders of critical deadlines corresponding to the stored data are automatically sent to the personal device of the user.

* * * * *